(12) United States Patent
Moon et al.

(10) Patent No.: US 8,852,803 B2
(45) Date of Patent: Oct. 7, 2014

(54) COMPOSITE, ELECTRODE ACTIVE MATERIAL FOR SECONDARY LITHIUM BATTERY INCLUDING THE COMPOSITE, METHOD OF PREPARING THE COMPOSITE, ANODE FOR SECONDARY LITHIUM BATTERY INCLUDING THE ELECTRODE ACTIVE MATERIAL, AND SECONDARY LITHIUM BATTERY INCLUDING THE ANODE

(75) Inventors: Sung-Hwan Moon, Yongin-si (KR);
Yury Matulevich, Yongin-si (KR);
Jae-Hyuk Kim, Yongin-si (KR);
Hee-Young Chu, Yongin-si (KR);
Myung-Hwan Jeong, Yongin-si (KR);
Chang-Ui Jeong, Yongin-si (KR);
Jong-Seo Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 242 days.

(21) Appl. No.: 13/243,851

(22) Filed: Sep. 23, 2011

(65) Prior Publication Data

US 2012/0251882 A1 Oct. 4, 2012

(30) Foreign Application Priority Data

Mar. 30, 2011 (KR) .................. 10-2011-0029028

(51) Int. Cl.
*H01M 4/13* (2010.01)
*H01M 4/58* (2010.01)
*H01M 4/88* (2006.01)

(52) U.S. Cl.
USPC ............... 429/218.1; 429/209; 252/182.1

(58) Field of Classification Search
None
See application file for complete search history.

(56) References Cited

U.S. PATENT DOCUMENTS

| | | |
|---|---|---|
| 2003/0054250 A1 | 3/2003 | Kweon et al. |
| 2007/0148553 A1 | 6/2007 | Weppner |
| 2007/0245546 A1 | 10/2007 | Le Cras et al. |
| 2008/0145758 A1 | 6/2008 | Kim et al. |
| 2010/0047696 A1 | 2/2010 | Yoshida et al. |
| 2010/0173199 A1 | 7/2010 | Hiraki et al. |
| 2010/0203383 A1 | 8/2010 | Weppner |
| 2011/0053000 A1 | 3/2011 | Kanamura et al. |
| 2011/0053002 A1 | 3/2011 | Yamamura et al. |

FOREIGN PATENT DOCUMENTS

| | | |
|---|---|---|
| JP | 2003-087180 A | 3/2003 |
| JP | 2005-327528 A | 11/2005 |
| JP | 2008-226463 A | 9/2008 |

(Continued)

OTHER PUBLICATIONS

Machine translation of JP 2010-045019, retrived from <http://www19.ipdl.inpit.go.jp/PA1/cgi-bin/PA1DETAIL> on Sep. 6, 2013.*

(Continued)

*Primary Examiner* — Cynthia K. Walls
(74) *Attorney, Agent, or Firm* — Robert E. Bushnell, Esq.

(57) ABSTRACT

A composite includes a compound selected from the group consisting of a lithium lanthanum zirconium oxide and a lithium lanthanum tantalum oxide; a lanthanum oxide; and an oxide selected from the group consisting of a lanthanum zirconium oxide and a lanthanum tantalum oxide. An electrode active material for a secondary lithium battery may include such composite. Methods of preparing the composite, an electrode for a secondary lithium battery including the electrode active material, and a secondary lithium battery including the electrode are disclosed.

26 Claims, 6 Drawing Sheets

(56) References Cited

FOREIGN PATENT DOCUMENTS

| JP | 2010-045019 | * | 2/2010 |
|---|---|---|---|
| KR | 2003-0008704 A | | 1/2003 |
| KR | 2007-0014141 A | | 1/2007 |
| KR | 10-2007-0039555 A | | 4/2007 |
| KR | 10-0759401 A | | 9/2007 |
| KR | 2010-0053543 A | | 5/2010 |

OTHER PUBLICATIONS

Atsushi Kaeriyama et al., Fabrication and evaluation of electochemical characteristics of Li7La3Zr2O12 Solid Electrolyte, 214th ESC Meeting/Prime 2008, Oct. 12, 2008, vol. 16., Issue 24, Department of Applied Chemistry, Graduate School of Engineering, Tokyo Metropolitan Univ.

Evaluation of Electrochemical Characteristics of Li7La3Zr2O12 Solid Electrolyte (vol. 16, Issue 24—Oct. 12-Oct. 17, 2008 , Honolulu, HI Student Posters (General)—214th ECS Meeting/PRiME 2008).

Korean Notice of Allowance issued on Aug. 9, 2013 by KR in connection with KR Patent Application No. 10-2011-0029028 and Request for Entry of the Accompanying Office Action attached herewith.

* cited by examiner

COMPOSITE, ELECTRODE ACTIVE MATERIAL FOR SECONDARY LITHIUM BATTERY INCLUDING THE COMPOSITE, METHOD OF PREPARING THE COMPOSITE, ANODE FOR SECONDARY LITHIUM BATTERY INCLUDING THE ELECTRODE ACTIVE MATERIAL, AND SECONDARY LITHIUM BATTERY INCLUDING THE ANODE

CLAIM OF PRIORITY

This application makes reference to, incorporates the same herein, and claims all benefits accruing under 35 U.S.C. §119 from an application earlier filed in the Korean Intellectual Property Office on 30 Mar. 2011 and there duly assigned Serial No. 10-2011-0029028.

BACKGROUND OF THE INVENTION

1. Field of the Invention

One or more embodiments of the present invention relate to a composite, an electrode active material for a secondary lithium battery including the composite, a method of preparing the composite, an electrode for a secondary lithium battery including the electrode active material, and a secondary lithium battery including the electrode.

2. Description of the Related Art

Currently, the demand of secondary lithium batteries used in mobile phones, camcorders, and notebook computers is increasing rapidly.

Among various secondary lithium batteries, a secondary lithium ion battery uses a liquid electrolyte, and due to the use of the liquid electrolyte, leakage, ignition, and explosion of the liquid electrolyte may occur. To overcome these problems, much effort is being performed to develop a flame-resistance electrolyte or an ionic liquid. The occurrence of such problems may also be completely prevented by developing a solid cell. A solid cell uses a solid electrolyte instead of the liquid electrolyte.

Meanwhile, cycle characteristics (lifetime characteristics) and stability of a battery may be enhanced by coating a surface of an electrode active material with a metal oxide, such as $Al_2O_3$, $TiO_2$, or $ZrO_2$.

SUMMARY OF THE INVENTION

One or more embodiments of the present invention include a composite, an electrode active material for a secondary lithium battery including the composite, a method of preparing the composite, an electrode for a secondary lithium battery including the electrode active material, and a secondary lithium battery including the electrode.

Additional aspects will be set forth in part in the description which follows and, in part, will be apparent from the description, or may be learned by practice of the presented embodiments.

According to one or more embodiments of the present invention, a composite includes: a compound selected from the group consisting of a compound represented by Formula 1 below and a compound represented by Formula 2 below; a lanthanum oxide ($La_2O_3$); and an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \qquad \text{[Formula 1]}$$

wherein, in Formula 1, L is an alkali metal,
M is a tri-valent metal, and
x is a number of 0 to 3, and $$L_{5+a}M_bTa_2O_{12} \qquad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3.

According to one or more embodiments of the present invention, an electrode active material for a secondary lithium battery includes the electrode active material including: a core active material; and a coating film formed on a surface of the core active material, wherein the coating film includes the composite as described above.

According to one or more embodiments of the present invention, a method of preparing a composite includes: mixing an alkali metal source, a tri-valent metal source, and at least one selected from the group consisting of a zirconium source and a tantalum source; and heat treating the mixture to obtain the composite as described above, wherein an amount of the alkali metal source is about 2.3 to about 3.1 mol, based on 1 mol of the tri-alent metal source.

According to one or more embodiments of the present invention, a method of preparing an electrode active material for a secondary lithium battery includes: mixing a core active material, the composite of any one of claims 1-12, and a solvent to prepare a mixture; and drying the mixture.

According to one or more embodiments of the present invention, an electrode for a secondary lithium battery includes the electrode active material as described above.

According to one or more embodiments of the present invention, a secondary lithium battery includes the electrode as described above.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
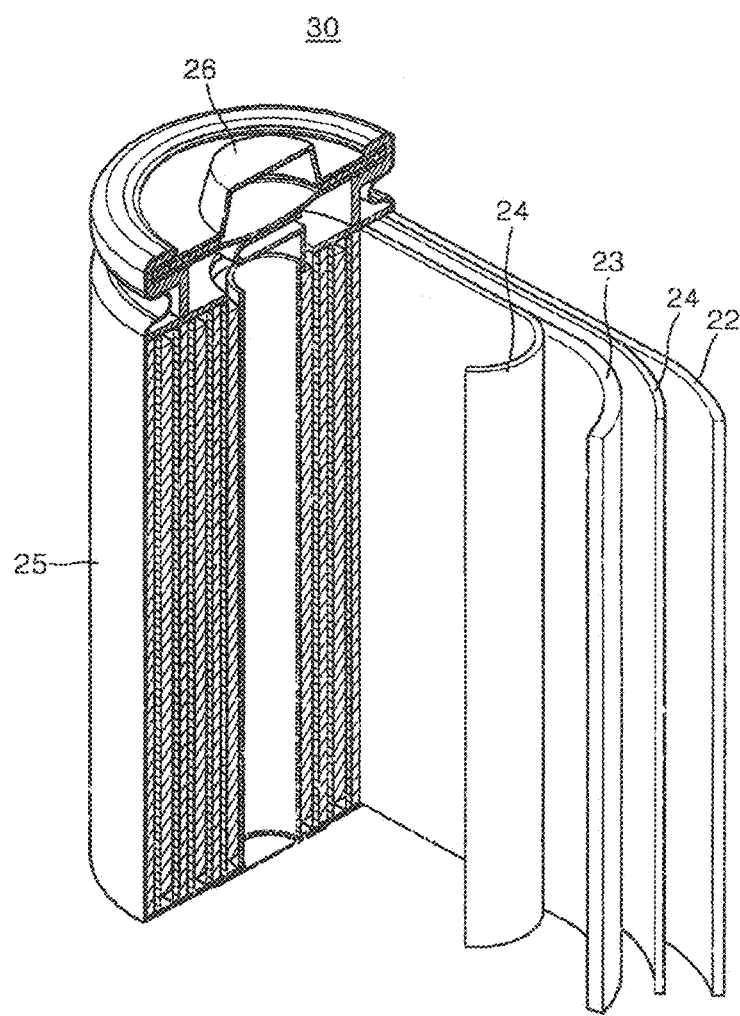
FIG. 1 is a schematic cross-sectional view of a secondary lithium battery constructed with an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present invention.

A composite according to an embodiment of the present invention includes a compound selected from the group consisting of a compound represented by Formula 1 below and a compound represented by Formula 2 below; a lanthanum oxide ($La_2O_3$); and an oxide selected from the group consisting of a lanthanum zirconium oxide and a lanthanum tantalum oxide:

$$L_{7+x}M_{3-x}Zr_2O_{12}$$ [Formula 1]

wherein, in Formula 1, L is an alkali metal,
M is a tri-valent metal, and
x is a number of 0 to 3, and $$L_{5+a}M_bTa_2O_{12}$$ [Formula 2]

wherein, in Formula 2, L is an alkali metal,
M is a tri-valent metal,
a is a number that is greater than 0 and equal to or less than 3, and
b is a number that is greater than 0 and equal to or less than 3.

In Formulae 1 and 2, L is selected from the group consisting of Li (Lithium), Na (Sodium), and K (Potassium), and M is a rare-earth element, such as La (Lanthanum) or Gd (Gadolinium).

In Formula 1, x may be, for example, a number of 0 to 1.
In Formula 2, a may be, for example, a number of more than 0 to 1, and b may be, 1.3 for example, a number of 2 to 3.

A compound represented by Formula 1 may be, for example, $Li_7La_3Zr_2O_{12}$.

A compound represented by Formula 2 may be, for example, $Li_5La_3Ta_2O_{12}$.

The oxide selected from the group consisting of a lanthanum zirconium oxide and a lanthanum tantalum oxide may be, for example, $La_2Zr_2O_7$.

Amounts of the lanthanum oxide ($La_2O_3$) and the oxide selected from the group consisting of a lanthanum zirconium oxide and a lanthanum tantalum oxide contained in the composite may be measured by analyzing an intensity of an X-ray diffraction (XRD) peak of the composite obtained by an X-ray diffraction (XRD) analysis.

In detail, an amount of the lanthanum oxide ($La_2O_3$) (component B) is measured by comparing a peak intensity of a Bragg 2θ angle of the lanthanum oxide ($La_2O_3$) (component B) with a peak intensity of a Bragg 2θ angle of at least one (component A) selected from the group consisting of the compound represented by Formula 1 and the compound represented by Formula 2.

An amount of an oxide (component C) selected from the group consisting of a lanthanum zirconium oxide and a lanthanum tantalum oxide is measured by comparing a peak intensity of a Bragg 2θ angle of the oxide (component C) selected from the group consisting of a lanthanum zirconium oxide and a lanthanum tantalum oxide with a peak intensity of a Bragg 2θangle of at least one (component A) selected from the group consisting of the compound represented by Formula 1 and the compound represented by Formula 2.

The X-ray diffraction uses a CuK-alpha characteristic X-ray wavelength of 1.541 Å.

In the composite, in the XRD spectrum, a ratio of an intensity of a main peak of the lanthanum oxide to an intensity of a main peak of the compound selected from the group consisting of the compound represented by Formula 1 and the compound represented by Formula 2 may be about 35:100 to 45:100. If the peak intensity ratio of the lanthanum oxide is within the range described above, the composite may have excellent ion conductive characteristics.

A ratio of the intensity of the main peak of the oxide selected from the group consisting of a lanthanum zirconium oxide and a lanthanum tantalum oxide to the intensity of the main peak of the compound selected from the group consisting of the compound represented by Formula 1 and the compound represented by Formula 2 may be 65:100 to 75:100.

If the peak intensity of the oxide selected from the group consisting of a lanthanum zirconium oxide and a lanthanum tantalum oxide is within the range as described above, the composite may have excellent ion conductive characteristics.

The component A has a main peak appearing at a 2θ of about 31°, the component B has a main peak appearing at a 2θ of about 30°, and the component C has a main peak appearing at a 2θ of about 28.5°.

These main peaks of the components A, B, and C are respectively the largest peaks of the components A, B, and C in a corresponding 2θ range. For example, in FIG. 2, the largest peaks are indicated by asterisks (★).

An example of the composite is a composite including a compound represented by Formula 1, a lanthanum oxide, and a lanthanum zirconium oxide. A main peak of the composite in the XRD spectrum appears in a range of about 15° to about 70°.

Another example of the composite is a composite including a compound represented by Formula 2, a lanthanum oxide, and a lanthanum tantalum oxide. A main peak of the composite in the XRD spectrum appears in a range of about 10° to about 70°.

An electrode active material for a secondary lithium battery according to an embodiment of the present invention includes a core active material, and a coating film formed on a surface of the core active material, wherein the coating film includes the composite as described above.

Hereinafter, a method of preparing the composite and a method of preparing an electrode active material for a secondary lithium battery including the composite will be described in detail.

First, an alkali metal source, a tri-valent metal source, and one selected from the group consisting of a zirconium source and a tantalum source are mixed. A mixing efficiency may be increased by using an agate mortar, a ball miller, or a mixer.

The alkali metal source may be a lithium carbonate ($Li_2CO_3$), a lithium sulfate ($Li_2SO_4$), a lithium nitride ($LiNO_3$), or a lithium hydroxide (LiOH).

The tri-valent metal source may be a lanthanum oxide ($La_2O_3$) or a lanthanum carbonate ($La_2(CO_3)_3$).

The zirconium source may be a zirconium oxide ($ZrO_2$), and the tantalum source may be a tantalum oxide ($Ta_2O_5$).

An amount of the alkali metal source may be about 2.3 to about 3.1 mol based on 1 mol of the tri-valent metal source. If the amount of the alkali metal source is within the range as described above, a composite having a target composition may be obtained.

An amount of the one selected from the group consisting of a zirconium source and a tantalum source may be about 1.2 to about 1.5 mol based on 1 mol of the tri-valent metal source.

When the amount of the one selected from the group consisting of a zirconium source and a tantalum source is within the range described above, the electrode active material may have excellent capacity and lifetime characteristics.

Subsequently, the mixture is heat treated at a temperature of about 500 to about 1300° C., for example, about 900 to about 1250° C., in an air atmosphere or an oxygen atmosphere.

A heat treatment time may vary depending on a heat treatment temperature. For example, the heat treatment time may be 1 hour or more, for example, 1 to 24 hours.

When the heat treatment temperature is within the range described above, the composite may have excellent ionic conductivity characteristics.

A core active material and a solvent are added to the composite and the resultant mixture is stirred.

Nonlimiting examples of the core active material are a carbonaceous material, such as graphite or carbon, a lithium metal or an alloy thereof, and a silicon oxide-based material. According to an embodiment of the present invention, graphite may be used as the core active material.

An amount of the core active material may be about 1900 to about 9900 parts by weight based on 100 parts by weight of the composite. If the amount of the core active material is within the range as described above, the electrode active material may have excellent lifetime characteristics without a decrease in capacity.

The solvent may be ethanol or isopropyl alcohol.

An amount of the solvent may be about 500 to about 10000 parts by weight based on 100 parts by weight of the total weight of the composite and the core active material.

If the amount of the solvent is within the range as described above, an electrode including the electrode active material may have excellent workability.

The stirred mixture is dried at a temperature of about 80 to about 200° C.

The drying temperature may be, for example, about 100 to about 120° C. If the drying temperature is within the range as described above, the electrode active material has excellent capacity and lifetime characteristics.

A drying time may vary depending on the drying temperature. For example, the drying time may be, for example, about 1 to about 24 hours.

XRD analysis results of an electrode active material obtained as described above show a $Li_7La_3Zr_2O_{12}$ phase, a $La_2Zr_2O_7$ phase, and a $La_2O_3$ phase.

The composite may be used as the first negative active material.

The electrode active material has excellent capacity characteristics and capacity retention characteristics, and enhanced lifetime characteristics.

The electrode active material for a secondary lithium battery may be, for example, a negative electrode active material. The composite may be used as the first negative active material.

The electrode active material may further include a second negative electrode active material. The second negative electrode active material may be a material that is commonly used in a lithium battery, and examples thereof are a carbonaceous material, such as graphite or carbon, a lithium metal or an alloy thereof, and a silicon oxide-based material.

An amount of the second negative electrode active material may be about 0.1 to about 90 parts by weight based on 100 parts by weight of the composite used as the first negative electrode active material.

Hereinafter, a method of manufacturing a secondary lithium battery using the electrode active material for a secondary lithium battery as a negative electrode active material will be described. In detail, a method of manufacturing a secondary lithium battery including a positive electrode, a negative electrode, a lithium salt-containing non-aqueous electrolyte, and a separator, according to an embodiment of the present invention, will be described in detail.

The positive electrode may be formed by doping a current collector with a composition for forming a positive active material layer and drying the doped composition, and the negative electrode may be respectively formed by doping a current collector with a composition for forming a negative active material layer and drying the doped composition.

The composition for forming a positive active material layer is prepared by mixing a positive electrode active material, a conducting agent, a binder, and a solvent.

The positive electrode active material may be any one of various positive electrode active materials that are commonly used in a lithium secondary battery. For example, the positive electrode active material may be a lithium transition metal oxide.

The lithium transition metal oxide may include at least one selected from the group consisting of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $LiMn_{2-z}Ni_zO_4$, $LiMn_{2-z}Co_zO_4$ (where $0<Z<2$), $LiCoPO_4$, and $LiFePO_4$.

A binder is a component that aids binding of an active material and a conducting agent and binding of an active material and a current collector. An amount of the binder used in the composition for forming a positive active material layer may be about 1 to about 50 parts by weight based on 100 parts by weight of the total weight of the positive electrode active material. Nonlimiting examples of the binder are polyvinylidenefluoride, polyvinylalcohol, carboxymethylcellulose (CMC), starch, hydroxypropylcellulose, generated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, and various copolymers. An amount of the binder may be about 2 to about 5 parts by weight based on 100 parts by weight of the total weight of the positive electrode active material. If the amount of the binder is within the range as described above, binding between an active material layer and a current collector may be sufficiently strong.

The conducting agent may be any one of various materials that do not cause any chemical change in a battery and have conductivity. Examples of the conductive agent are graphite, such as natural graphite or artificial graphite; a carbonaceous material, such as carbon black, acetylene black, Ketjen black, channel black, furnace black, lamp black, or thermal black; a conductive fiber, such as carbon fiber or metal fiber; metallic powder, such as fluorocarbon powder, aluminum powder, or nickel powder; a conductive whisker, such as zinc oxide or potassium titanate; a conductive metal oxide, such as titanium oxide; and polyphenylene derivatives.

An amount of the conducting agent may be about 2 to about 5 parts by weight based on 100 parts by weight of the total weight of the positive electrode active material. If the amount of the conducting agent is within the range as described above, an electrode having excellent characteristics may be obtained.

A nonlimiting example of the solvent is N-methylpyrrolidone.

An amount of the solvent may be about 1 to about 10 parts by weight based on 100 parts by weight of the positive electrode active material. If the amount of the solvent is within the range as described above, a positive active material layer may be easily formed.

A thickness of the current collector used to form the positive electrode may be about 3 to about 500 µm, and a material for forming the current collector may be any one of various materials that do not cause any chemical change in a battery and have high conductivity. Examples of such a material are stainless steel, aluminum, nickel, titanium, heat treated carbon, and aluminum or stainless steel surface-coated with carbon, nickel, titanium, or silver. The current collector may have an uneven surface so as to increase a cohesive force of the positive electrode active material, and the current collector may have a film, sheet, foil, net, or foam form, or may have a porous structure or a non-woven structure.

Separately, the negative electrode active material including a composite constructed with the present invention, a binder, a conducting agent, and a solvent are mixed to prepare the composition for forming a negative electrode active material layer, where the composite includes a compound selected from the group consisting of a compound represented by Formula 1 below and a compound represented by Formula 2 below; a lanthanum oxide ($La_2O_3$); and an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
M is a tri-valent metal, and
x is a number of 0 to 3, and $$L_{5+a}M_bTa_2O_{12} \quad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3.

An amount of the binder used herein may be about 1 to about 50 parts by weight based on 100 parts by weight of the total weight of the negative electrode active material. Nonlimiting examples of the binder may be the same as those presented with regard to the positive electrode.

An amount of the conducting agent may be about 1 to about 5 parts by weight based on 100 parts by weight of the total weight of the negative electrode active material. If the amount of the conducting agent is within the range as described above, an electrode having excellent conductivity may be obtained.

An amount of the solvent may be about 1 to about 10 parts by weight based on 100 parts by weight of the total weight of the negative electrode active material. If the amount of the solvent is within the range described above, a negative active material layer may be easily formed.

The conducting agent and the solvent may be formed of those materials presented with regard to the positive electrode.

The current collector used to form the negative electrode may have a thickness of about 3 to about 500 µm. A material for forming the negative electrode current collector may be any one of various materials that do not cause any chemical change in a battery and have high conductivity. Examples of such a material are copper, stainless steel, aluminum, nickel, titanium, heat treated carbon, copper or stainless steel surface-treated with carbon, nickel, titanium, or silver, or an alloy including aluminum and cadmium. Also, like the positive electrode current collector, a binding force of the negative electrode active material may be enhanced by forming a fine uneven structure at a surface of the negative electrode current collector. The negative electrode current collector may have a film, sheet, foil, net, or foam form, or may have a porous structure or a non-woven structure.

The separator is interposed between the positive electrode and negative electrode manufactured as described above.

The separator may have a pore size of about 0.01 to about 10 µm and a thickness of about 5 to about 300 µm. The separator may be formed of, for example, an olefin-based polymer, such as polypropylene or polyethylene; or a sheet or non-woven fabric formed of glass fiber. If a solid electrolyte, such as a polymer, is used, the solid electrolyte may also function as the separator.

The lithium salt-containing non-aqueous electrolyte may include a non-aqueous electrolyte solution and lithium. Examples of the non-aqueous electrolyte are a non-aqueous electrolyte solution, an organic solid electrolyte, and an inorganic solid electrolyte.

A nonlimiting example of the non-aqueous electrolyte solution is a non-protonic organic solvent and nonlimiting examples thereof are N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofurane, dimethylsulfoxide, 1,3-dioxorane, formamide, dimethylformamide, dioxorane, acetonitrile, nitromethane, methyl formic acid, methyl acetic acid, trimester phosphoric acid, trimethoxy methane, dioxorane derivative, sulforane, methyl sulforane, 1,3-dimethyl-2-imidazolidinone, propylene carbonate derivative, tetrahydrofurane derivative, ester, methyl propionic acid, and ethyl propionic acid.

Nonlimiting examples of the organic solid electrolyte are a polyethylene derivative, a polyethylene oxide derivative, a polypropylene oxide derivative, a phosphoric acid ester polymer, a polyester sulfide, polyvinyl alcohol, and polyvinylidene fluoride.

Nonlimiting examples of the inorganic solid electrolyte are a nitride, halide, or sulphate of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

Nonlimiting examples of a lithium salt are $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium low aliphatic carbonate, and lithium tetraphenyl borate, each of which is easily dissolved in the non-aqueous electrolyte.

FIG. 1 is a schematic cross-sectional view of a secondary lithium battery 30 according to an embodiment of the present invention.

Referring to FIG. 1, the secondary lithium battery 30 includes a positive electrode 23, a negative electrode 22, a separator 24 interposed between the positive electrode 23 and the negative electrode 22, an electrolyte (not shown) with which the positive electrode 23, the negative electrode 22, and the separator 24 are impregnated, a battery case 25, and a sealing member 26 for sealing the battery case 25. In order to manufacture the secondary lithium battery 30, the positive electrode 23, the negative electrode 22, and the separator 24 are sequentially deposited and rolled and placed in the battery case 25. The battery case 25 is sealed with the sealing member 26, thereby completing manufacture of the secondary lithium battery 30.

The present invention will be described in further detail with reference to the following examples. These examples are for illustrative purposes only and are not intended to limit the scope of the present invention.

Preparation Example 1

Preparation of Composite

Amounts of $Li_2CO_3$, $La_2O_3$, and $ZrO_2$ were calculated according to a stoichiometric ratio. The amount of $Li_2CO_3$ was 258.6 g, the amount of $La_2O_3$ was 488.7 g, and the amount of $ZrO_2$ was 123.2 g. In addition, 25.9 g of $Li_2CO_3$ was further used. Then, the compounds were uniformly mixed in an agate mortar.

Then, the mixture was heated treated at a high temperature of 1000° C. or higher for 5 hours or more to form a composite including $Li_7La_3Zr_2O_{12}$ (LLZ), $La_2O_3$, and $La_2Zr_2O_7$.

Regarding the composite, a ratio of a peak intensity of a Bragg 2θ angle of an lanthanum oxide ($La_2O_3$), with respect to a CuK-alpha characteristic X-ray wavelength of 1.541 Å, to a peak intensity of a Bragg 2θ angle of LLZ was about 39:100, and a ratio of a peak intensity of a Bragg 2θ angle of $La_2Zr_2O_7$, with respect to a CuK-alpha characteristic X-ray wavelength of 1.541 Å, to the peak intensity of the Bragg 2θ angle of LLZ was about 68:100.

Preparation Example 2

Preparation of Composite

Amounts of $Li_2CO_3$, $La_2O_3$, and $ZrO_2$ were calculated according to a stoichiometric ratio. The amount of $Li_2CO_3$ was 258.6 g, the amount of $La_2O_3$ was 488.7 g, and the amount of $ZrO_2$ was 123.2 g. In addition, 51.7 g of $Li_2CO_3$ was further used. Then, the processes described in Preparation Example 1 were performed.

Regarding the composite, a ratio of a peak intensity of a Bragg 2θ angle of lanthanum oxide ($La_2O_3$), with respect to a CuK-alpha characteristic X-ray wavelength of 1.541 Å, to a peak intensity of a Bragg 2θ angle of LLZ was about 42:100, and a ratio of a peak intensity of a Bragg 2θ angle of $La_2Zr_2O_7$ with respect to a CuK-alpha characteristic X-ray wavelength of 1.541 Å to the peak intensity of a Bragg 2θ angle of LLZ was about 72:100.

Comparative Preparation Example 1

Preparation of LLZ

Amounts of $Li_2CO_3$, $La_2O_3$, and $ZrO_2$ were calculated according to a stoichiometric ratio. The amount of $Li_2CO_3$ was 258.6 g, the amount of $La_2O_3$ was 488.7 g, and the amount of $ZrO_2$ was 123.2 g. The compounds were uniformly mixed in an agate mortar.

Then, the mixture was heated treated at high temperature of 1000° C. or higher for 5 hours or more to form LLZ.

Figure 2:
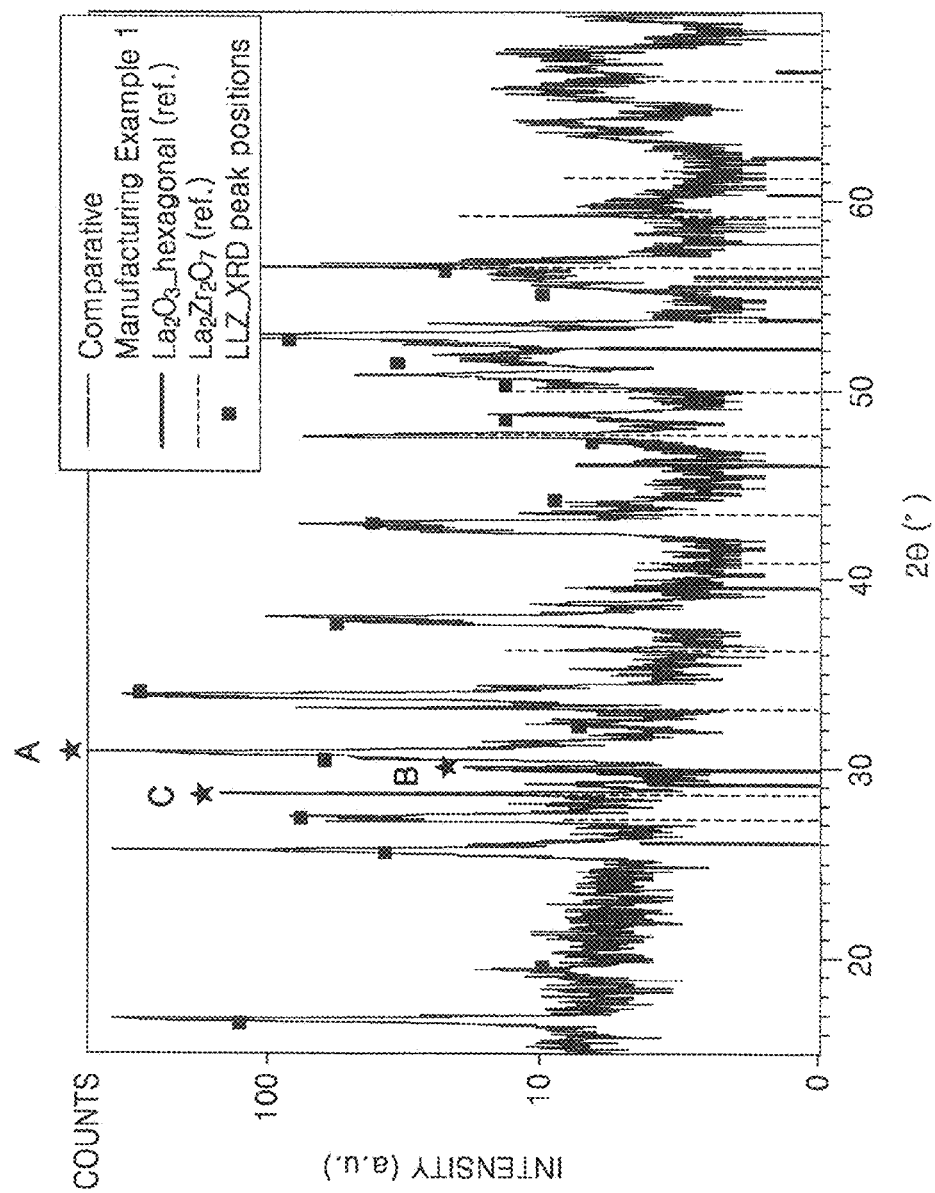
FIG. 2 is an X-ray diffraction analysis graph of a composite prepared according to Preparation Example 1.

An XRD analysis on the composite manufactured according to Preparation Example 1 was performed and results are shown in FIG. 2. Referring to FIG. 2, it was confirmed that the formed composite had three phases: LLZ, $La_2O_3$, and $La_2Zr_2O_7$ in Preparation Example 1.

Example 1

Preparation of Negative Electrode Active Material 3 g of the composite prepared according to Preparation Example 1 was homogeneously dispersed in 1000 g of ethanol, and 100 g of graphite was added thereto at room temperature while stirring using a magnetic stirrer. In this case, the amount of the composite was controlled to be 3 parts by weight based on 100 parts by weight of graphite.

When the addition of the graphite was completed, the mixture was stirred for 4 hours or more. Then, the completely stirred mixture was dried in a drying furnace at a temperature of 100° C. to prepare a negative electrode active material.

A surface state of the negative electrode active material prepared according to Example 1 was analyzed by using electron scanning microscopy (SEM). SEM analysis results are shown in FIG. 3.

Figure 3:
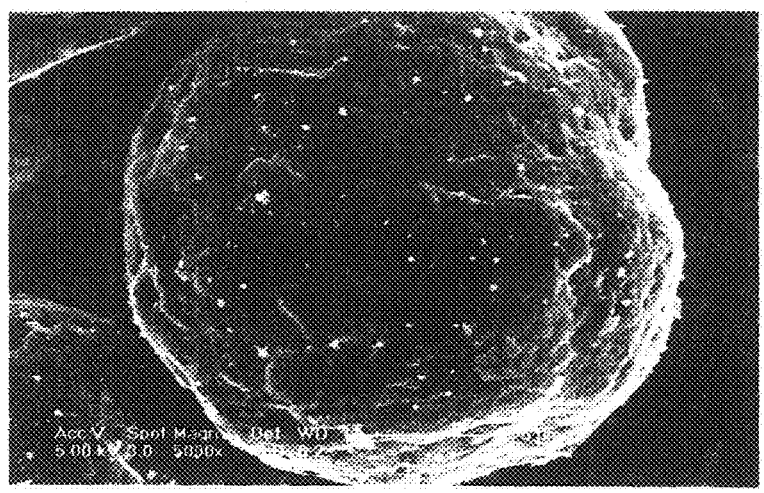
FIG. 3 shows a scanning electron microscopy (SEM) image of a negative electrode active material prepared according to Example 1.
Figure 4:
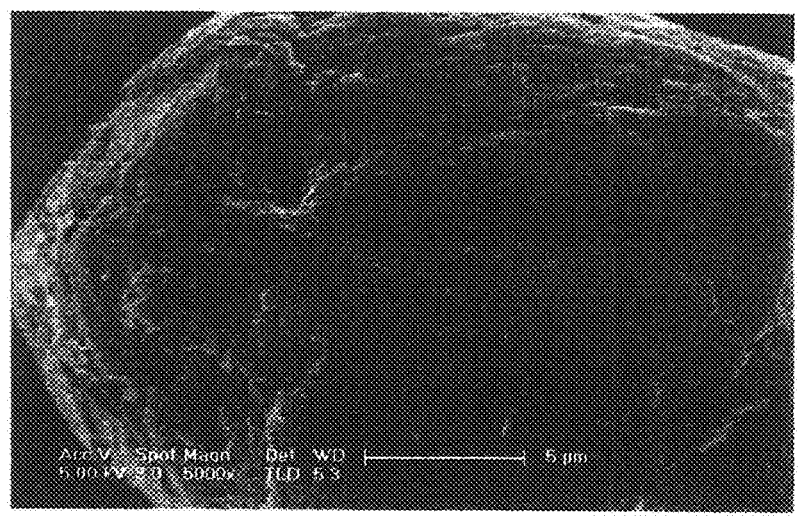
FIG. 4 is an SEM image of graphite.

In order to be compared with the surface state of the negative electrode active material of FIG. 3, a surface state of graphite was also analyzed by using SEM, and results are shown in FIG. 4.

Referring to FIGS. 3 and 4, it was confirmed by comparing the negative electrode active material of FIG. 3 and the graphite of FIG. 4 that a surface of the graphite in the negative electrode active material was coated with the composite in the negative electrode active material of FIG. 3.

Comparative Example 1

Preparation of Negative Electrode Active Material

A negative electrode active material was prepared in the same manner as in Example 1, except that LLZ prepared according to Comparative Preparation Example 1 was used instead of the composite prepared according to Preparation Example 1.

Manufacturing Example 1

Manufacturing of Coin Cell 96 g of the composite prepared according to Preparation Example 1, 2 g of styrene-butadiene rubber as a binder, and 2 g of carboxymethyl cellulose as a thickener were dispersed in 300 g of water to prepare a composition for forming a negative electrode active material layer.

The composition for forming the negative active material layer was coated on a copper foil to a thickness of 50 μm, thereby forming a thin electrode plate. The thin electrode plate was dried at a temperature of 135° C. for 3 hours or more and pressed to form a negative electrode.

Then, a CR2016-type coin cell was manufactured by using the negative electrode and a lithium metal electrode as a reference electrode. A separator (thickness: about 16 μm) formed of polyethylene (PE) film was interposed between the negative electrode and the lithium metal electrode, and an electrolyte was injected thereto, thereby completing manufacture of a coin-cell.

In this regard, the electrolyte was a solution including 1.1M $LiPF_6$ dissolved in a mixed solvent including ethylenecarbonate (EC), ethylmethylcarbonate (EMC), 4-fluorobenzene (FB), and dimethylcarbonate (DMC) at a volumetric ratio of 3:5:1:1.

Comparative Manufacturing Example 1

Manufacturing of Coin Cell

A coin cell was manufactured in the same manner as in Manufacturing Example 1, except that 96 g of graphite was used instead of the composite prepared according to Preparation Example 1.

Comparative Manufacturing Example 2

Manufacturing of Coin Cell

A coin cell was manufactured in the same manner as in Manufacturing Example 1, except that LLZ prepared according to Comparative Preparation Example 1 was used instead of the composite prepared according to Preparation Example 1.

Lifetime characteristics of the coin cells manufactured according to Manufacturing Example 1 and Comparative Manufacturing Example 1 were evaluated as follows.

The coin cells manufactured according to Manufacturing Example 1 and Comparative Manufacturing Example 1 were charged with a constant current (1 C) at a constant voltage (0.01V, 0.01 C cut-off), rested for 10 minutes, and discharged with a constant current (1 C, 1.5V cut-off), which constitutes one charge and discharge cycle. The charge and discharge cycle was performed 100 times. That is, by referring to a change in discharge capacity with respect to the number of charge and discharge cycles, lifetime characteristics of the respective coin cells were evaluated.

Figure 5:
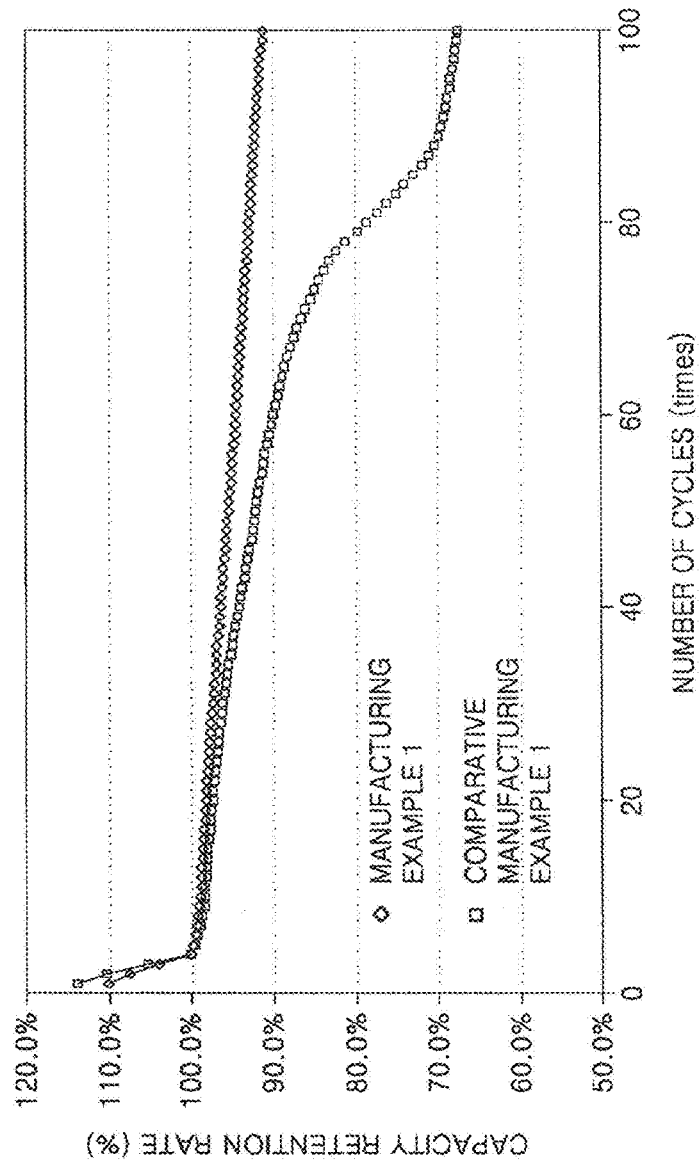
FIG. 5 is a graph for evaluating lifetime characteristics of lithium batteries manufactured according to Manufacturing Example 1 and Comparative Manufacturing Example 1.

Referring to FIG. 5, it can be confirmed that the coin cell of Manufacturing Example 1 has better lifetime characteristics than the coin cell of Comparative Manufacturing Example 1.

Figure 6:
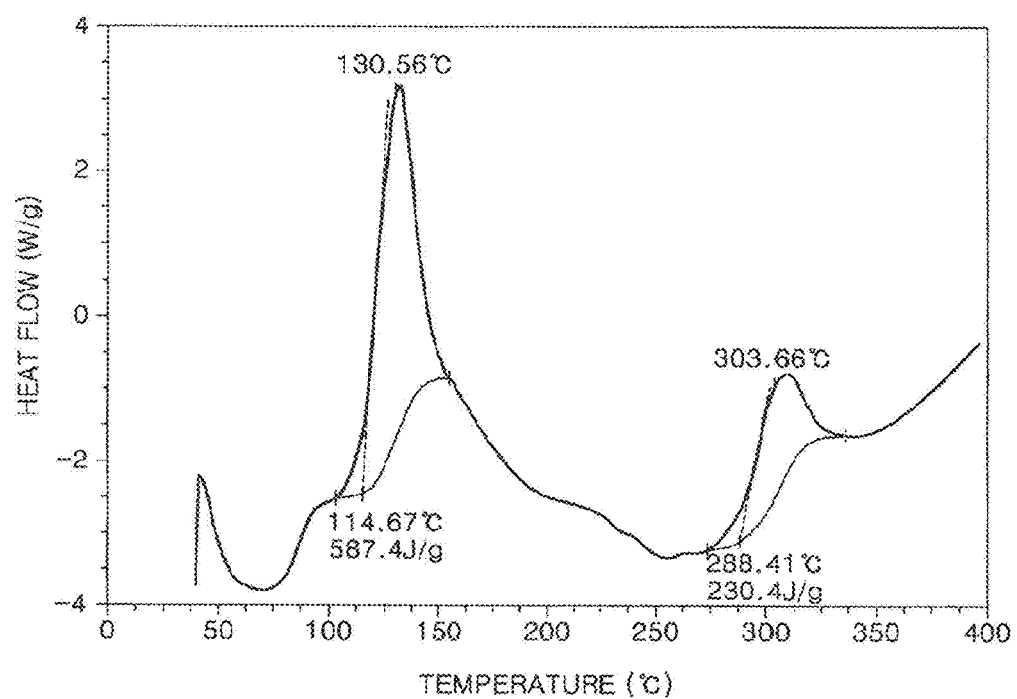
FIGS. 6 and 7 are differential scanning calorimetry analysis graphs of a composite prepared respectively according to Preparation Example 1 and LLZ prepared according to Comparative Preparation Example 1.
Figure 7:
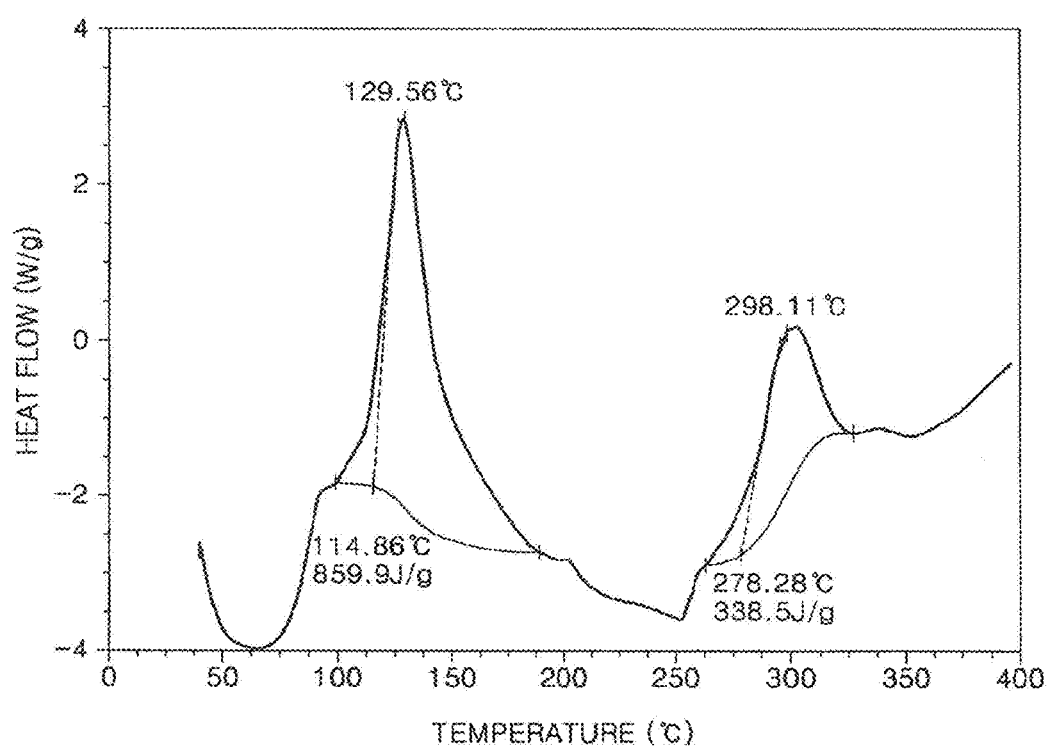

Thermal characteristics of the composite of Preparation Example 1 and LLZ of Comparative Preparation Example 1 were evaluated by differential scanning calorimetry (DSC), and results are shown in FIGS. 6 and 7.

Referring to FIGS. 6 and 7, it was confirmed that the composite of Preparation Example 1 had a smaller calorific value than LLZ of Comparative Preparation Example 1 at substantially same temperatures. From the result, it is deemed that a battery manufactured using the negative electrode active material of Preparation Example 1 has higher stability than a battery manufactured using LLZ of Comparative Preparation Example 1.

As described above, the composite according to the one or more of the above embodiments of the present invention may be used as an electrode active material for a lithium secondary battery. If an electrode for a secondary lithium battery is manufactured by using the electrode active material, a secondary lithium battery including the electrode may have enhanced lifetime characteristics and stability characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A lithium secondary battery, comprising:
   a positive electrode comprising a positive electrode active material;
   a negative electrode comprising a negative electrode active material comprising a composite which comprises:
   a compound selected from the group consisting of a compound represented by Formula 1 below and a compound represented by Formula 2 below;
   a lanthanum oxide ($La_2O_3$); and
   an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
   M is a tri-valent metal, and
   x is a number of 0 to 3, and $$L_{5+a}M_bTa_2O_{12} \quad \text{[Formula 2]}$$

wherein, in Formula 2, L is an alkali metal,
   M is a tri-valent metal,
   a is a number that is greater than 0 and equal to or less than 3, and
   b is a number that is greater than 0 and equal to or less than 3; and
   a separator disposed between the positive electrode and the negative electrode.

2. The lithium secondary battery of claim 1, wherein in Formulae 1 and 2, L is selected from the group consisting of Li, Na, and K.

3. The lithium secondary battery of claim 1, wherein, in Formulae 1 and 2, M is La or Gd.

4. The lithium secondary battery of claim 1, wherein the compound represented by Formula 1 is $Li_7La_3Zr_2O_{12}$.

5. The lithium secondary battery of claim 1, wherein the compound represented by Formula 2 is $Li_5La_3Ta_2O_{12}$.

6. The lithium secondary battery of claim 1, wherein a ratio of a main peak intensity of a Bragg 2θ angle of the lanthanum oxide ($La_2O_3$) in an X-ray diffraction spectrum to a main peak intensity of a Bragg 2θ angle of the compound selected from the group consisting of the compound represented by Formula 1 and the compound represented by Formula 2 in an X-ray diffraction spectrum is 35:100 to 45:100.

7. The lithium secondary battery of claim 1, wherein a ratio of a main peak intensity of a Bragg 2θ angle of the oxide selected from the group consisting of the lanthanum zirconium oxide and the lanthanum tantalum oxide in an X-ray diffraction spectrum to a main peak intensity of a Bragg 2θ angle of the compound selected from the group consisting of the compound represented by Formula 1 and the compound represented by Formula 2 in an X-ray diffraction spectrum is 65:100 to 75:100.

8. The lithium secondary battery of claim 1, wherein the oxide is $La_2Zr_2O_7$.

9. The lithium secondary battery of claim 1, wherein the composite comprises the compound of Formula 1, the lanthanum oxide, and the lanthanum zirconium oxide.

10. The lithium secondary battery of claim 9, wherein a main peak of the composite in an X-ray diffraction spectrum appears in a range of about 15 to about 70 degrees.

11. The lithium secondary battery of claim 1, wherein the composite comprises the compound of Formula 2, the lanthanum oxide, and the lanthanum tantalum oxide.

12. The lithium secondary battery of claim 11, wherein a main peak of the composite in an X-ray diffraction spectrum appears in a range of about 10 to about 70 degrees.

13. A lithium secondary battery, comprising:
   a negative electrode comprising a negative electrode active material, the negative electrode active material comprising:
   a core active material; and
   a coating film formed on a surface of the core active material,
   wherein the coating film comprises the composite of comprising:
   a compound selected from the group consisting of a compound represented by Formula 1 below and a compound represented by Formula 2 below;
   a lanthanum oxide ($La_2O_3$); and
   an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
   M is a tri-valent metal, and
   x is a number of 0 to 3, and $$L_{5+a}M_bTa_2O_{12} \quad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3.

14. The lithium secondary battery of claim 13, wherein an amount of the core active material is about 1900 to about 9900 parts by weight based on 100 parts by weight of the composite.

15. A method of preparing a lithium secondary battery, the method comprising:
forming a positive electrode comprising a positive electrode active material;
forming a negative electrode comprising a negative electrode active material by following steps:
mixing an alkali metal source, a tri-valent metal source, and at least one selected from the group consisting of a zirconium source and a tantalum source; and
heat treating the mixture to obtain a composite comprising:
a compound selected from the group consisting of a compound represented by Formula 1 below and a compound represented by Formula 2 below;
a lanthanum oxide ($La_2O_3$); and
an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
M is a tri-valent metal, and
x is a number of 0 to 3, and $$L_{5+a}M_bTa_2O_{12} \quad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3,
wherein an amount of the alkali metal source is about 2.3 to about 3.1 mol, based on 1 mol of the tri-valent metal source; and
disposing a separator between the positive electrode and the negative electrode.

16. The method of claim 15, wherein the heat treatment is performed at a temperature of about 500 to about 1300° C.

17. A method of preparing a lithium secondary battery, the method comprising:
forming a negative electrode comprising a negative electrode active material by following steps:
mixing a core active material, a composite, and a solvent to prepare a mixture, the composite comprising:
a compound selected from the group consisting of a compound represented by Formula 1 below and a compound represented by Formula 2 below;
a lanthanum oxide ($La_2O_3$); and
an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
M is a tri-valent metal, and
x is a number of 0 to 3, and $$L_{5+a}M_bTa_2O_{12} \quad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3; and
drying the mixture.

18. The method of claim 17, wherein the drying is performed at a temperature of about 80 to about 200° C.

19. A negative electrode of a lithium secondary battery, the negative electrode comprising:
a negative electrode current collector; and
an electrode active material comprising:
a compound selected from the group consisting of a compound represented by Formula 1 below and a compound represented by Formula 2 below;
a lanthanum oxide ($La_2O_3$); and
an oxide selected from the group consisting of a lanthanum zirconium oxide ($La_2Zr_2O_7$) and a lanthanum tantalum oxide ($La_2Ta_2O_7$):

$$L_{7+x}M_{3-x}Zr_2O_{12} \quad \text{[Formula 1]}$$

wherein, in Formula 1, L is an alkali metal,
M is a tri-valent metal, and
x is a number of 0 to 3, and $$L_{5+a}M_bTa_2O_{12} \quad \text{[Formula 2]}$$

wherein, in Formula 2, L is an alkali metal,
M is a tri-valent metal,
a is a number that is greater than 0 and equal to or less than 3, and
b is a number that is greater than 0 and equal to or less than 3.

20. The lithium secondary battery of claim 13, wherein in Formulae 1 and 2, L is selected from the group consisting of Li, Na, and K, M is La or Gd.

21. The lithium secondary battery of claim 13, wherein the compound represented by Formula 1 is $Li_7La_3Zr_2O_{12}$, and the compound represented by Formula 2 is $Li_5La_3Ta_2O_{12}$.

22. The lithium secondary battery of claim 13, wherein a ratio of a main peak intensity of a Bragg 2θ angle of the lanthanum oxide ($La_2O_3$) in an X-ray diffraction spectrum to a main peak intensity of a Bragg 2θ angle of the compound selected from the group consisting of the compound represented by Formula 1 and the compound represented by Formula 2 in an X-ray diffraction spectrum is 35:100 to 45:100.

23. The lithium secondary battery of claim 13, wherein a ratio of a main peak intensity of a Bragg 2θ angle of the oxide selected from the group consisting of the lanthanum zirconium oxide and the lanthanum tantalum oxide in an X-ray diffraction spectrum to a main peak intensity of a Bragg 2θ angle of the compound selected from the group consisting of the compound represented by Formula 1 and the compound represented by Formula 2 in an X-ray diffraction spectrum is 65:100 to 75:100.

24. The lithium secondary battery of claim 13, wherein the oxide is $La_2Zr_2O_7$.

25. The lithium secondary battery of claim 13, wherein the composite comprises the compound of Formula 1, the lanthanum oxide, and the lanthanum zirconium oxide.

26. The lithium secondary battery of claim 13, wherein the composite comprises the compound of Formula 2, the lanthanum oxide, and the lanthanum tantalum oxide.

* * * * *